United States Patent [19]

Miller

[11] Patent Number: 4,959,634

[45] Date of Patent: Sep. 25, 1990

[54] VEHICLE DECELERATION WARNING APPARATUS

[76] Inventor: Ronald L. Miller, 7300 Cascade Rd., Grand Rapids, Mich. 49508

[21] Appl. No.: 253,043

[22] Filed: Oct. 4, 1988

[51] Int. Cl.$^5$ .............................................. B60Q 1/26
[52] U.S. Cl. ..................................... 340/467; 340/463
[58] Field of Search ............... 340/464, 467, 479, 463; 324/166

[56] References Cited

U.S. PATENT DOCUMENTS

| | | | |
|---|---|---|---|
| 2,764,962 | 10/1956 | Warren et al. | 340/464 X |
| 3,239,807 | 3/1966 | Williams | 340/464 |
| 3,774,152 | 11/1973 | Tandy | 340/464 |
| 4,149,141 | 4/1979 | Tanimura | 340/464 |
| 4,257,005 | 3/1981 | Hall | 324/166 |
| 4,418,331 | 11/1983 | Chicoine | 340/467 |

*Primary Examiner*—Reinhard J. Eisenzopf
*Assistant Examiner*—Robert W. Mueller

*Attorney, Agent, or Firm*—Varnum, Riddering, Schmidt & Howlett

[57] ABSTRACT

An apparatus is disclosed for monitoring the operating conditions of a vehicle for the purpose of initiating a warning signal to following vehicles of impending deceleration prior to actual application of the vehicle braking system. The piston of a pneumatic cylinder is coupled to a vehicle throttle to provide linear translation of the throttle position and movement, the piston being biased to return the piston rod at a predetermined rate when the throttle position is altered for lower vehicles speed. Switching means are secured to the piston rod. The switch is in a normally open position, the switch being closed when appropriate deceleration is detected. When the deceleration switch is closed, a warning signal will be transmitted to following vehicles unless, disabled by signal levels reflective of appropriate manifold vacuum, prior application of the braking system or insufficient vehicle velocity to require a warning signal.

5 Claims, 2 Drawing Sheets

VEHICLE DECELERATION WARNING APPARATUS

DESCRIPTION

1. Technical Field

The present invention generally relates to devices employed to monitor vehicle operating conditions, and in particular, to those devices employed to monitor and alert observers to impending conditions of danger

2. Background Art

Although the improvement in vehicle designs have included apparatus for enhancing vehicle safety, the equipment which is used today to warn following drivers that a vehicle is decelerating has changed little in the past 50 years. The only devices taught by the prior art to signal the deceleration of a vehicle is the use of warning lights on the rear of the vehicle which are directly actuated by the braking mechanism of the vehicle. Until the driver of the decelerating vehicle depresses or otherwise actuates the braking system to energize warning lights, the following vehicle has absolutely no warning. Until recent years, the conventional vehicle has only two tail lights on the rear of the vehicle which are energized only when the operator activated the braking system. The sole improvement disclosed by the prior art relates only to improving the position of the warning light relative to the line-of-sight of the driver of a following vehicle.

The inherent disadvantages and inadequacies of the devices disclosed by the prior art are evident. Where a driver observes an obstruction in the roadway or other conditions which will require the speed of the vehicle to be substantially reduced or even stopped, the warning systems disclosed by the prior art cannot be activated until the driver recognizes the problem and physically actuates the braking system. This is particularly dangerous where the view of the following driver is obstructed either by road conditions or by the size of the vehicle itself. In addition, actuation of the braking system of conventional vehicles require the driver to typically remove his or her foot from the accelerator and physically move it to the brake pedal. The time expended between the recognition of the danger condition and application of the braking system can exceed an interval of one second. Since a vehicle will commence to decelerate as soon as the driver releases the application of force from the coupling to the engine throttle, the driver of a following vehicle will have no warning until the brake pedal is actually depressed and tail lights are energized.

The present invention substantially overcomes the inadequacies which are inherent to the devices disclosed by the prior art. The present invention provides for the activation of a warning light upon the detection of a predetermined rate of deceleration. Since actuation of the warning light is independent of the driver applying the braking system, the driver of a following vehicle will be warned the forward vehicle is stopping, or at the least, decelerating at a substantial rate earlier than can be achieved by the devices taught by the prior art. The results of an early warning is increased safety, and a substantially improvement over the systems disclosed by the prior art.

SUMMARY OF THE INVENTION

The primary element of the present invention indirectly senses the commencement of vehicle deceleration and activates warning indicia to a following vehicle in advance of mechanical activation of the braking system. The operator of the vehicle controls the movement of the vehicle by the force, or lack thereof, applied to the vehicle accelerator pedal. The accelerator pedal is conventionally linked to the engine throttle which in turn primarily controls the fuel being delivered to the engine. After a vehicle reaches operating velocity, a reduction of fuel to the engine will cause the vehicle to decelerate to a lower speed. The present invention will activate a warning signal to following vehicles when a predetermined level of deceleration is sensed. The engine throttle is coupled to the present invention through the use of a linearly moveable interface plate which will translate the pivotable throttle movement to the linear movement of the plate along a guide track. A piston rod aligned with the track is in abutment with a surface of the interface plate. The piston rod is employed as part of a conventional pneumatic cylinder. Movement of the throttle in a direction which will cause acceleration will be translated to movement of the piston rod and piston to compress a helical spring. When the speed of the vehicle is reduced, the force imposed by the spring against the piston rod will cause it to travel in the opposite direction at a controllable rate.

In order to avoid activation of the warning system at insufficient levels of deceleration, independent switching means is coupled intermediate the piston rod and the throttle interface plate. A second helical spring has its base fixed in relationship to the piston rod and has sufficient force to cause the closure of an electrical translating device if the movement of the throttle and the delayed response of the pneumatic valve results in a spacial interval between the throttle interface plate and the end of the piston rod. Under these conditions, an electrical switch will close which will be translated into a signal which will activate a signal warning of the probable activation of the braking system.

Additional means are provided to inhibit the actuation of the warning signal generated by the throttle sensor under specified conditions relating to engine work output. These are conditions arising when the throttle position has been decreased by the driver, but the engine is still producing velocity-accelerating or velocity-sustaining power. An example is a decreased throttle position providing for reduced acceleration yet continuing to increase vehicle velocity.

It is therefore an object of the present invention to provide an improved system for monitoring vehicle deceleration and activation of warning indicia.

It is another object of the present invention to provide a vehicle deceleration warning apparatus which will initiate a warning signal to following vehicles prior to actual activation of the vehicle braking system.

It is still yet another object of the present invention to provide a vehicle deceleration warning apparatus which can distinguish between probable activation of the braking system and normal vehicle operating conditions.

It is still yet another object of the present invention to provide a vehicle deceleration warning system which is simple and inexpensive to fabricate.

The novel features which are believed to be characteristic of the invention, both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWING

The invention will now be described with reference to the Drawings, in which.

DETAILED DESCRIPTION

Figure 1:
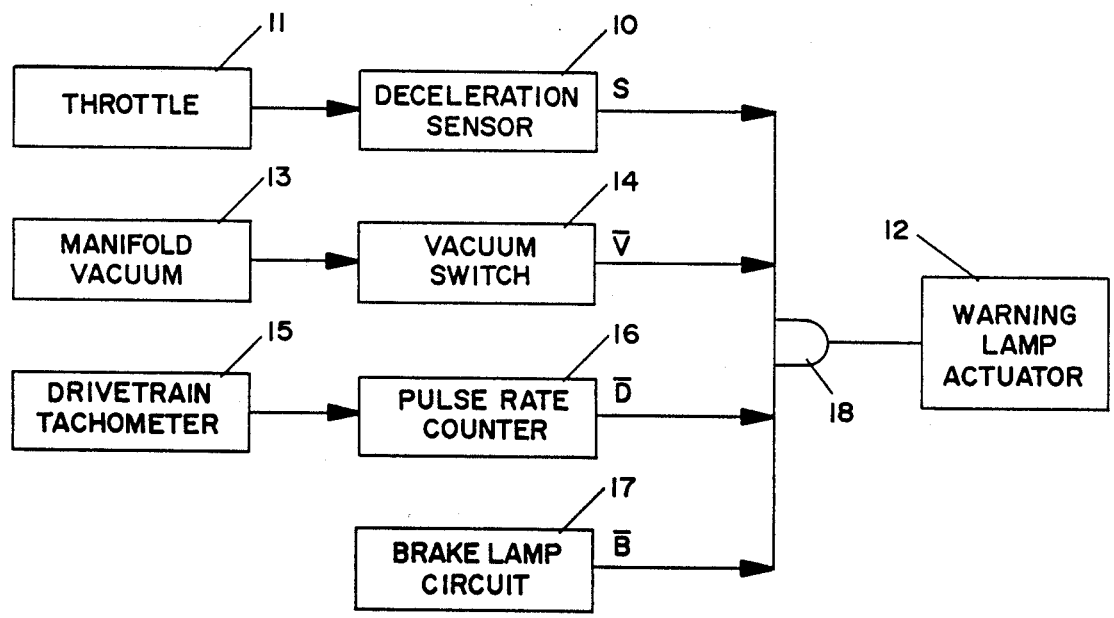
FIG. 1 is a schematic diagram of the signal processing logic of the present invention.
Figure 2:
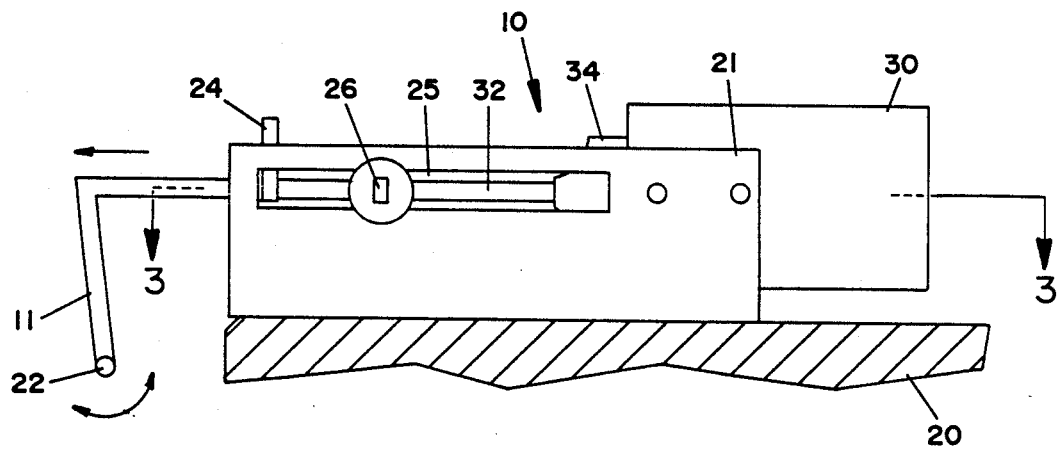
FIG. 2 is a side elevation schematic view of the present invention mounted upon a vehicle engine

An understanding of the preferred embodiment of the present invention can be best gained by reference to FIG. 1 which comprises a schematic diagram of the basic data sources and signal logic for implementing the preferred embodiment of the present invention. The primary objective of the present invention is to initiate a warning signal to a driver of a following vehicle when monitored data indicates the driver is commencing a significant deceleration of the vehicle but prior to actual activation of the braking system. The primary element in the present invention is deceleration sensor 10. The data input to deceleration sensor 10 is based on the mechanical positioning of the vehicle throttle 11. As will be discussed in further detail hereinbelow, deceleration sensor 10 will output an enabling signal "S" to activate the warning lamp actuator 12 if, and only if, it monitors a sufficient rate of deceleration which is indicative of the intention of the driver to halt or substantially slow the vehicle.

The remaining data which are monitored are for the purpose of indicating normal operating conditions which will inhibit the actuation of warning indicia. The engine manifold vacuum 13 is monitored by a conventional vacuum switch 14 which is commonly used in the automotive industry. Vacuum switch 14 monitors a pneumatic signal. When the manifold vacuum increases, it represents a decrease in engine output power. Until the manifold vacuum increases to a pre-determined limit, the engine may be assumed to be producing output power such that the vehicle will accelerate or continue to move at a fixed velocity. A drop in the manifold vacuum below a predetermined level will actuate switch 14. When activated, the output of vacuum switch 14 is a disabling signal "J" which will inhibit the operation of warning lamp actuator 12.

Where the vehicle is running in a lower gear, it is possible for the speed of the vehicle to be sufficiently low to obviate the necessity for a warning light activation but will cause the manifold vacuum to be sufficiently high to prevent signal inhibition through elements 13 and 14. The vehicle drive train tachometer 15 is monitored, the standard output being a series of pulses, the rate of which is a function of the vehicle road speed. By employing a conventional pulse rate counter 16, the warning light actuator 12 will be disabled by an output signal "D" from pulse rate counter 16 until the predetermined velocity is reached.

The brake lamp circuit 17 is monitored to determine when the braking system is activated. As stated hereinabove, a primary objective of the present invention is to provide a signal to actuate a warning lamp prior to actual activation of the braking system. If the brake lamp circuit 17 provides a signal "B" indicating the braking system has been activated prior to reduction of an enabling signal from deceleration sensor 10, the output of AND gate 18 will be disabled.

The deceleration sensor 10 is the essential element of the present invention and can be best understood by reference to FIGS. 2, 3A, 3B and 3C. It should be understood that the form of the deceleration sensor 10 shown in these illustrations is in schematic form and is illustrated solely for the purpose of facilitating a description of the operation thereof. Deceleration sensor 10 will typically be mounted upon the engine block 20 through the use of any conventional mounting means which are sufficient to mechanically locate deceleration sensor 10 in proximity to engine throttle 11. As stated hereinabove, the sole data input to deceleration sensor 10 is a function of the engine throttle.

In the embodiment of the present invention illustrated herein, throttle 11 comprises the mechanical linkage from the vehicle accelerator pedal to the engine carburetor (not shown). In a conventional vehicle engine, throttle 11 will typically pivot about a fixed axis 22, the direction thereof being a function of the position of the vehicle accelerator pedal Referring to FIG. 2, where throttle 11 is rotating about axis 22 in a clockwise direction, the accelerator pedal is being depressed for increased vehicle velocity When rotating in a counterclockwise direction, the pressure on the accelerator pedal has been released or, at the least, reduced. The terminus 23 of throttle 11 is coupled to the adjacent surface of sensor input plate 24.

Sensor input plate 24 is limited to linear movement which is defined by guide track 25. Although it is clear other mechanical alternatives can be used, the embodiment of the present invention shown in FIGS. 2, 3A, 3B and 3C utilizes a guide positioner 26 which, when inserted into guide 25, restricts input plate 24 to linear movement in specific alignment with guide track 25. When throttle 11 is pivoted, the horizontal position vector of terminus 23 will be translated into linear movement of sensor input plate 24.

The purpose of deceleration sensor 10 is to detect when the vehicle operator has released pressure on the accelerator pedal resulting in the rotation of throttle 11 in a counterclockwise position at a rate which is indicative of a warning condition. The quiescent condition of deceleration sensor 10 can be best seen by reference to FIG. 3A. To sense the reciprocating movement of sensor input plate 24, the preferred embodiment of the present invention employs pneumatic cylinder 30 which is secured to guide frame 21. It is understood that the function of pneumatic cylinder 30 could be implemented through other conventional devices such as a hydraulic cylinder, the use of a pneumatic device being selected for its operating efficiency and economy. Pneumatic cylinder 30 incorporates an internally mounted piston 31. Piston rod 32 is axially disposed through the upper cylinder wall 33 and is suitably journaled in guide 34 to insure that piston rod 32 is in parallel spaced relation to guide track 25 and perpendicular to input plate 24.

A resilient helical spring 35 is axially disposed between piston 31 and cylinder end plate 36. An outlet orifice valve 37 is disposed in end plate 36. Orifice valve 37 will provide for the evacuation of air when piston 31 is freely moved from left to right compressing helical spring 35. Orifice valve 37 will not permit ingress of ambient air into the chamber between piston 31 and cylinder end plate 36. Inlet valve 38 is disposed through cylinder end plate 36 to provide for the controlled ingress of air into the chamber intermediate piston 31 and cylinder end plate 36 when piston 31 is being moved from right to left as a result of the force imposed on piston 31 by the expansion of helical spring 35. Whereas outlet orifice valve 37 will allow piston 31 to freely compress spring 35 when throttle 11 is being pivoted in a clockwise direction (i.e., increased acceleration), the controlled ingress of air through inlet valve 38 will produce a force to counter the expansion of helical spring 35 for a purpose which will be described in detail hereinbelow.

Figure 3A:
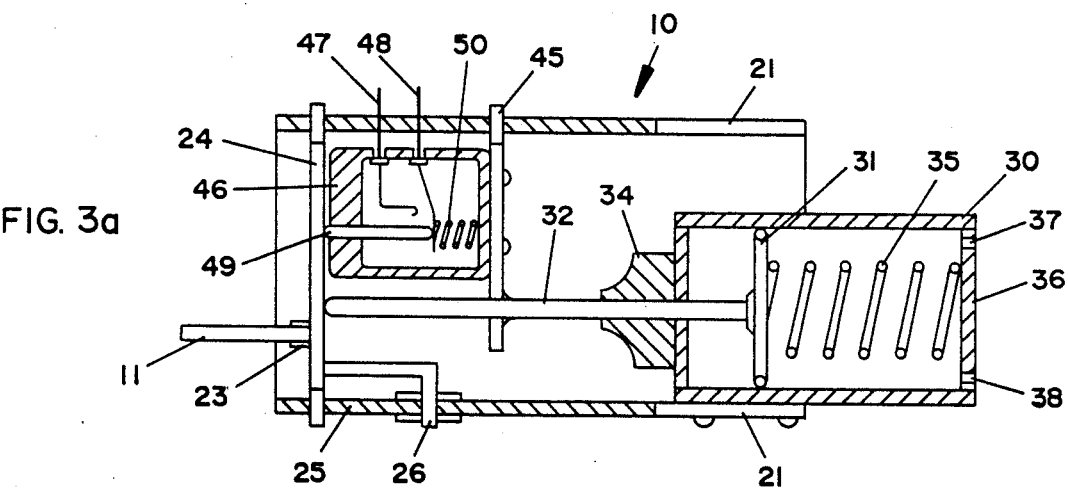
FIG. 3A is a top plan view, in partial cross-section, of the present invention taken through lines 3—3 of FIG. 1 schematically illustrating the deceleration sensor in its quiescent position.
Figure 3B:
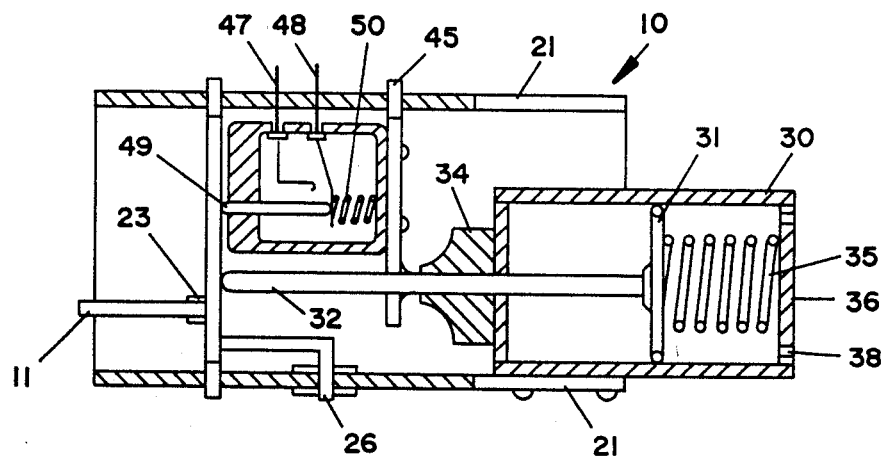
FIG. 3B is a top plan view, in partial cross-section, taken through lines 3—3 of FIG. 1 illustrating the deceleration sensor positioned by the engine throttle in an operating position.
Figure 3C:
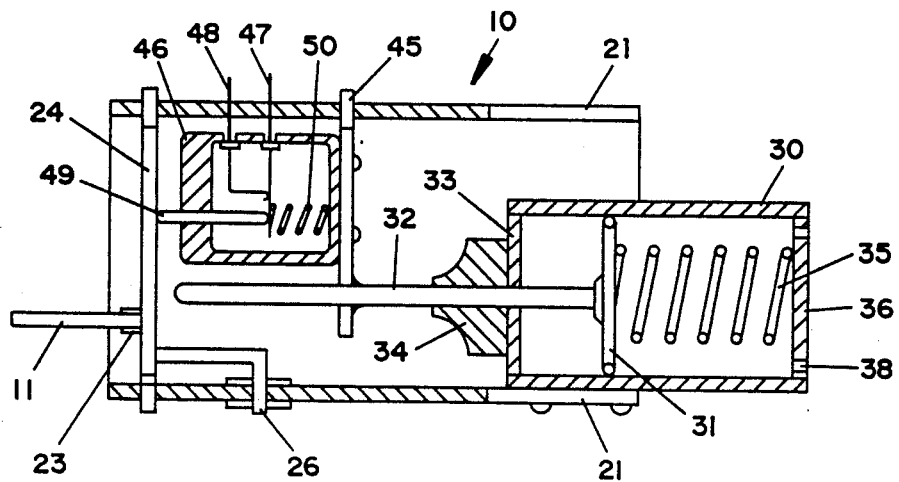
FIG. 3C is a top plan view, in partial cross-section, taken through lines 3—3 of FIG. 1 illustrating the deceleration sensor in position for actuating warning indicia.

The operation of pneumatic cylinder 30 can be best understood by reference to FIGS. 3A, 3B and 3C. FIG. 3A illustrates a quiescent operating condition of the vehicle. Throttle 11 is coupled to one surface sensor input plate 24, and piston rod 32 is in abutment with the opposite surface of input plate 24 FIG. 3B illustrates a vehicle operating condition which occurs when throttle 11 has been positioned for a higher vehicle speed which results in the compression of helical spring 35 within the cylinder chamber bounded by piston 31 and cylinder end plate 36. The function of inlet valve 38 can be best seen in FIG. 3C. Counter-clockwise rotation of throttle 11 will cause sensor input plate 24 to linearly move from right to left. Since inlet valve 38 controls the rate at which air will be allowed to enter cylinder 30, a spacial interval will be created between the end of piston rod 32 and the surface of input plate 24 if the rate of deceleration has exceeded the predetermined deceleration rate which is to be used to activate a warning signal.

Switch assembly 46 mounted upon base 45 which in turn is secured to piston rod 32. It is therefore clear any linear movement of piston rod 32 will be directly translated to base 45. Switch assembly 46 comprises a pair of electrical contacts 47 and 48. Contact 47 is normally open; contact 48 is a wiper contact. One end of a helical spring 50 is coupled to base 45. Contact actuating pin 49 is mounted within switch assembly 46 in axial alignment with helical spring 50. Actuating pin 49 is in parallel spaced relation to piston rod 32 and is reciprocally moveable through and appropriately journaled within switch assembly 46. In the quiescent operating condition illustrated in FIG. 3A, both actuating pin 49 and piston rod 32 are in abutment with sensor input plate 24. In this position, actuating pin 49 compresses helical spring 50 and prevents electrical contacts 47 and 48 from completing an actuating circuit. When throttle 11 is in the position which represents vehicle movement, although helical spring 35 in cylinder 30 has been compressed, the relative positions of actuating pin 49 and piston rod 32 have not changed from that shown in FIG. 3A. Under this condition, there is no contact between normally open contact 47 and wiper contact 48.

The ability of the deceleration sensor 10 to detect conditions requiring a warning signal can be best seen by reference to FIG. 3C. As described, the counter-clockwise rotation of throttle 11 causes sensor input plate 24 to linearly move in the direction shown. FIG. 3C illustrates the condition where throttle 11 has rotated at a rate which causes coupled sensor input plate 24 to move at a rate which is greater than that of piston rod 32 which is predetermined by the setting of inlet valve 38. If the rotation of throttle valve does not exceed the predetermined rate, deceleration sensor 10 as shown in FIG. 3B will return to the condition shown in FIG. 3A without the closure of contacts 47 and 48. Under the conditions shown in FIG. 3C, the expansion of helical spring 50 will cause wiper contact 48 to engage normally open contact 47 resulting in electrical continuity therebetween. Referring to FIG. 1, electrical continuity between contacts 47 and 48 will result in the output signal "S" which will enable warning lamp actuator 12. Acceleration sensor will return from the condition shown in FIG. 3C to that shown in FIG. 3A when the linear movement of piston rod 32 and base 45 causes actuating pin 49 to break the continuity between electrical contacts 47 and 48.

It can therefore be seen the present invention provides an improved apparatus for detecting the impending deceleration of a vehicle and initiating a warning signal to the driver of a following vehicle in advance of the actual activation of the braking system. Although the functions of the present invention have been implemented as described herein, it is understood all functions of acceleration sensor 10 and the processing units shown in FIG. 1 can be implemented through on-board computers which are now being employed in vehicles. Through the use of standard transducers, physical data representing pressure, mechanical movement, etc., can be directly translated into digital signals which can then be processed to generate the function of the present invention.

It will be apparent to those skilled in the pertinent arts that still further embodiments of apparatus in accordance with the invention can be designed. That is, the principles of a vehicle warning signal actuating apparatus in accordance with the invention are not limited to the specific embodiment described herein. It will be apparent to those skilled in the arts that modifications and other variations of the above-described illustrative embodiment of the invention may be effected without departing from the spirit and scope of the novel concepts of the invention.

The embodiments of the invention in which an exclusive property or privilege is claimed are defined as follows:

1. A vehicle warning signal actuating apparatus for monitoring the operation of a vehicle and the engine thereof, said apparatus comprising:
   deceleration sensor means for actuating a warning signal upon sensing the rate of vehicle deceleration that exceeds a predetermined rate;
   velocity sensing means for monitoring the operating velocity of the vehicle and producing a signal which is a function thereof;
   vacuum sensing means for monitoring the vehicle engine manifold pressure and producing a signal which is a function thereof;
   brake monitoring means for sensing activation of the vehicle braking system and producing a signal which is a function thereof; and
   a warning signal actuator coupled to each of said deceleration sensor means, velocity sensing means, vacuum sensing means and brake monitoring means and producing a warning activation signal only when the predetermined rate of deceleration has been exceeded and the velocity and manifold pressure of the vehicle are not within normal operating conditions and the vehicle braking system has not been activated.

2. A vehicle warning signal actuating apparatus as defined in claim 1 wherein said velocity sensing means comprises pulse means for directly translating the output of the engine tachometer to a pulse train, the rate of which is a function of the vehicle's road speed; and a pulse counter coupled to said pulse means, said pulse counter enabling the warning actuation signal only when the rate of said pulse train exceeds a predetermined standard 3. A vehicle warning signal actuating apparatus as defined in claim 1 wherein said vacuum sensing means comprising a vacuum switch coupled to the vehicle engine manifold, the vacuum switch producing an output signal enabling the warning actuation signal only if the engine manifold vacuum exceeds a predetermined standard.

4. A vehicle warning signal actuating apparatus as defined in claim 1 wherein said brake monitoring means comprises a binary switching element coupled to the vehicle brake system, said binary switching elements producing an output signal enabling the warning actuation signal only when the vehicle braking system has not been activated.

5. A vehicle warning signal actuating apparatus as defined in claim 1 wherein said deceleration sensor means comprises:
   input means coupled to the throttle of the engine for translating the reciprocal movement of the engine throttle into reciprocating linear movement;
   an actuating rod aligned to reciprocally move in alignment with said input means, said actuating rod adapted to be in abutment with or separate from said input means as a function of the reciprocal movement of the engine throttle;
   resilient means coupled to said actuating rod for controllably urging said actuating rod toward said input means following its separation from said input means after movement of the engine throttle; and
   switching means for initiating the warning actuation signal, said switching means coupled to said actuating rod, said warning actuation signal being actuated for a period of time which is a function of the spacial gap between said input means and actuating rod and the rate at which the actuating rod is urged toward said input means by said resilient means.

* * * * *